Figure 6:
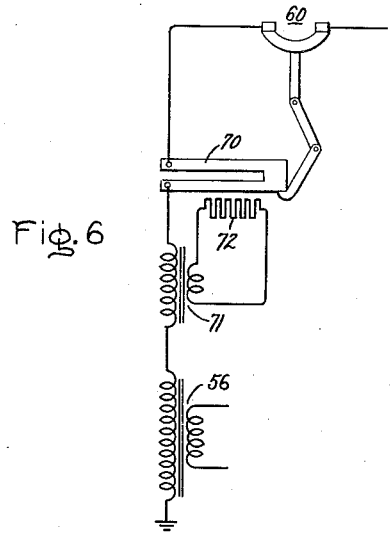

Feb. 29, 1944.    J. R. BARR    2,343,132
DISTRIBUTION SYSTEM AND PROTECTIVE ARRANGEMENT THEREFOR
Filed Aug. 15, 1942    2 Sheets-Sheet 1
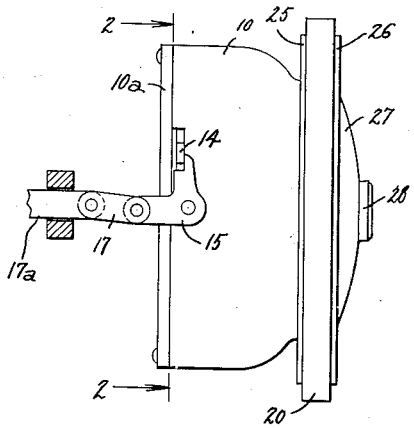
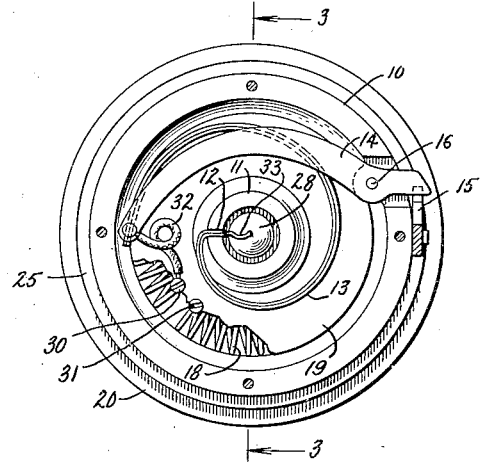
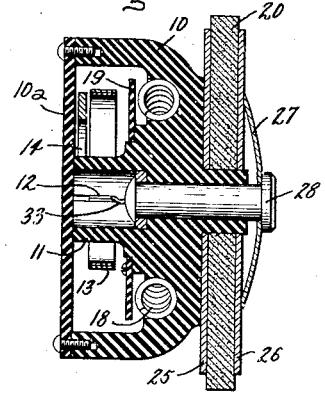
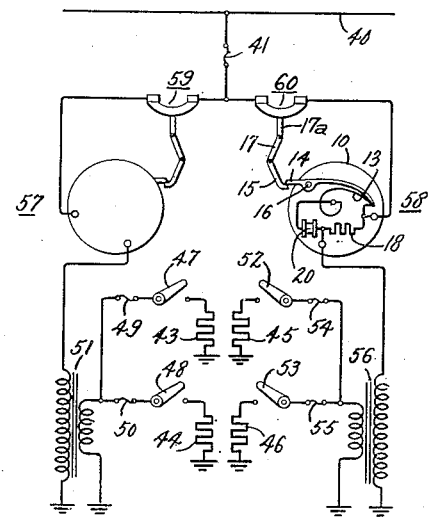
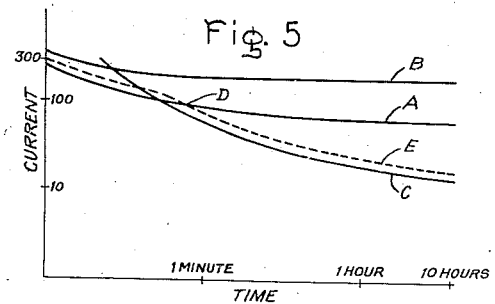
Inventor:
James R. Barr,
by Harry E. Dunham
His Attorney.

Inventor:
James R. Barr,
by Harry E. Dunham
His Attorney.

Patented Feb. 29, 1944

2,343,132

UNITED STATES PATENT OFFICE 2,343,132

DISTRIBUTION SYSTEM AND PROTECTIVE ARRANGEMENT THEREFOR

James R. Barr, Pittsfield, Mass., assignor to General Electric Company, a corporation of New York Application August 15, 1942, Serial No. 455,004

23 Claims. (Cl. 175—294)

My invention relates to distribution systems and particularly to overload or excessive current protective arrangements for distribution systems supplying domestic and small power loads.

More particularly, my invention relates to distribution systems of the type comprising a plurality of groups of parallel connected transformers connected to a primary or distribution supply circuit with each transformer connected to supply current to a small group of consumers, such as residences and small shops.

It is a general object of my invention to provide overload protective means for a distribution system of this type, which protective means provides the greatest possible continuity of power supply to the various consumers while fully protecting against damage from excessive currents each component part of the system, i. e., the line or distribution circuit itself, the transformers, and the individual consumers' circuits connected to the transformers. In accordance with my invention, the interruption of service is localized to the particular consumers' circuit, transformer, or group of transformers in which the excessive current appears.

Heretofore, in accordance with generally accepted standards, a protective "house" fuse has been provided at the entrance switch of each consumer and a sectionalizing fuse has been supplied between each group of transformers and the distribution circuit. While such protection insures the individual safety of the consumer's load devices and of the primary or distribution circuit, it does not provide adequate protection for the transformers of the various groups. Various types of transformer protective means have been devised, but such prior transformer protective means have not been so coordinated with the other protective devices of the system to insure a proper and positive system cooperation whereby service interruptions shall be localized to the fullest extent.

The main fuse in each consumer or house circuit is selected with respect to the connected load in that building, in accordance with fire underwriters rules, without regard to the capacity of the transformer supplying that load. Frequently this fuse permits each house circuit to carry a load in excess of the transformer rating, so that the consumer's fuses do not protect the transformer against low overloads resulting from a plurality of simultaneous consumer's loads within their respective fuse ratings. The consumer's fuse does protect the house circuit against high overload currents, i. e., currents of short circuit and near short circuit magnitude, and it is selected for that purpose. In protecting the house circuit under short circuit conditions the fuse blows quickly enough also to protect the transformer against such high overload currents in the house circuit. Thus a transformer rated to supply a maximum current of 20 amperes continuously may be connected to several house circuits each of which is supplied through a fuse having a 60-ampere continuous current capacity. Ordinarily, the current supplied to the lamps and other devices on any house circuit does not at any time approach, even on transformer overload, the continuous current carrying capacity of the house fuse, and when a house fuse blows, it is nearly always the result of a house short circuit. However, a low overload caused by current in a single house circuit of the order of one and one-half to three times the maximum continuous transformer current will overload and damage the transformer although the house fuse having a continuous capacity of perhaps 3 times the rated transformer current, will not blow. One explanation of this high current fusing of house circuits is the assumption that the house circuits on any one transformer will not all carry their maximum loads at the same time, together with the fact that the house fuse is intended primarily to protect the consumer's wiring and load devices against short circuit without regard to the rating of the connected transformer.

The line or sectionalizing fuse ordinarily is selected adequately to protect the line or supply circuit against both low overload and short circuit currents. Its current rating is too high to protect the individual transformers against low current overloads but it is capable of protecting the transformers against short circuits which by-pass the house fuses and against high overload on any transformer resulting from a large number of consumer's circuit loads each individually too small to affect the house fuse. However, protection of a single transformer by this means will disable an entire group of transformers.

It is therefore a further object of my invention to provide overload current protective means for the transformer itself, which protective means is coordinated with the house fuses and with the sectionalizing fuse in such manner as to provide special protection for the transformer against low overload currents too small to blow the house fuses or sectionalizing fuse, and also protect the transformer and the sectionalizing fuse against high transformer overload currents of short circuit and near short circuit magnitude, while providing for operation of the house fuse to take care of such a high overload when it occurs in a single house circuit, and operating before the sectionalizing fuse to take care of such a high overload when the overload does not appear in a house circuit so that it is not taken care of by a house fuse or is caused by a number of simultaneous low house circuit overloads in a single transformer.

It is a still further object of my invention to provide a distribution system including overload protective apparatus having one predetermined time-current operating characteristic in low overload current range and a predetermined modified time-current operating characteristic in the high overload current range.

Still another object of my invention is to provide a transformer overload protective relay which shall have operating characteristics suitably conforming to the safe overload characteristics of a distribution transformer for currents less than the minimum operating currents of connected fuse elements and which shall have an operating characteristic similar to those of connected fuse elements in the range of operation of these elements.

It is a specific object of my invention to provide a transformer overload protective relay for a distribution system having a load fuse and a sectionalizing line fuse which shall provide suitable overload protection for the transformer for all currents below a predetermined value slightly greater than the minimum fuse actuating current and which upon the occurrence of higher currents shall protect the line sectionalizing fuse while permitting prior operation of the load fuse.

In one form of my invention the above and other objects are attained in a simple, efficient, and inexpensive manner by providing a thermal relay immersed in the oil of an oil-filled distribution transformer tank. The relay comprises a thermo-responsive member normally actuated by a single load responsive heating element to disconnect the distribution transformer from the line in response to a light overload according to a predetermined time-current characteristic, and includes additional heating means operable upon the occurrence of exceptionally high overload or short circuit currents to modify the characteristic of operation of the thermo-responsive member in such a manner as to accelerate its response. The thermo-responsive member is preferably so selected that its accelerated response under various high overload conditions follows the time-current characteristic of a fuse and protects the line sectionalizing fuse while still permitting prior operation of the house entrance or load fuse.

According to one preferred and relatively simple embodiment of my invention, the relay comprises an electric heating element connected in series circuit relation with the high voltage side of the distribution transformer and positioned to supply heat to a deformable bimetallic member arranged to disconnect the transformer from its source of supply with a predetermined time-current characteristic. Such a heating element might, of course, be connected through a current transformer. To accelerate the response of the bimetallic member upon high overload currents the bimetallic member is electrically connected across the heating element in series circuit relation with a nonlinear negative resistance-voltage characteristic resistor. At low load currents the voltage drop across the heating element is low and consequently the resistance of the nonlinear resistor is high so that the resistor substantially precludes the flow of current through the heater shunt circuit including the bimetallic element. However, the characteristic of the nonlinear blocking resistor is such that when a predetermined high overload current flows through the heating element and the voltage drop across the resistor is increased, the resistance of the resistor will be quickly and materially decreased. In this manner the bi-metallic member is heated directly by the passage of electric current through it. While the unblocking of this direct heating shunt circuit substantially diminishes the relative amount of current supplied to the main electric heater, and may in some forms of the invention actually decrease the amount of indirect heating, the various parts may be so selected that the direct heat, acting substantially independently, heats the bimetal more rapidly than the indirect heat when it is acting substantially independently.

Figure 7:
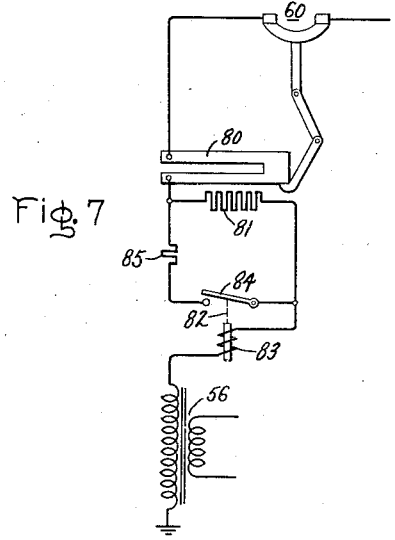

For a more complete understanding of my invention and further appreciation of its objects and advantages, attention should now be directed to the following detailed specification taken in conjunction with the accompanying drawings in which Fig. 1 is a side elevation of a transformer overload protective relay embodying my invention; Fig. 2 is a cross-sectional view of the relay taken along the line 2—2 of Fig. 1; Fig. 3 is a cross-sectional view taken along the line 3—3 of Fig. 2; Fig. 4 is a schematic circuit diagram and connections showing a number of my protective relays connected in a representative distribution system; Fig. 5 is a graphical representation by logarithmic curves of the operating characteristics of the various protective devices involved in the distribution system of Fig. 4; and Figs. 6 and 7 are schematic circuit diagrams of connections for overload relays embodying my invention in modified forms.

Referring now to the drawings, and particularly to Figs. 1 to 5, the relay itself comprises in one form a cup-shaped housing 10 of non-conducting material such as a suitable molded plastic insulating material, many types of which are well known to those skilled in the art. The cup-shaped housing 10 is substantially closed by a removable cover plate 10a and formed to provide a hollow cylindrical central supporting post 11 slotted radially at one point, such as 12 to provide a fixed support for the inner end of a spirally shaped thermo-responsive bimetallic member 13. The outer and free end of the bimetallic element 13 is pivotally attached to one end of a detent lever 14, the other end of which projects through one wall of the cup-shaped housing 10 to engage a suitable latch member 15. As shown in the drawings, the detent lever 14 may be pivotally mounted intermediate its ends upon the housing 10 by a pivot pin 16.

While any suitable circuit breaker tripping mechanism may be provided, I have shown the latch arm 15 in the form of a bell crank lever forming with a link 17 a toggle mechanism for releasably holding in circuit closing position a switch member 17a.

Within the base of the cup-shaped housing 10, I provide an electric heating resistor 18. As shown in Figs. 2 and 3, the resistor 18 may suitably comprise a helix of resistance wire bent to form an annulus and positioned within a complementally shaped groove molded in the bottom of the cup-shaped housing 10. In order to provide suitable time-current response characteristics of the device, it may be necessary or desirable to provide baffling means for dividing the housing 10 into two compartments and restricting the free flow of heat from the resistor 18 to the bimetallic element 13. In Fig. 3 I have shown such a baffle in the form of an annulus 19 of insulating material carried by the central post 11 of the housing 10 and interposed between the heating resistor 18 and the bimetallic strip 13. For the purpose of controlling the energization of the heating resistor 18, I mount externally of the housing 10 a blocking impedance 20 of the type having a nonlinear negative impedance-voltage characteristic.

By negative impedance-voltage characteristic impedance I mean one whose ohmic value decreases with increases in voltage thereacross or current therethrough. Many such resistance devices are known in the art. For example, there are resistance devices of this character which operate through voltage changes, generally also with a temperature change. Thus certain forms of carbon and boron have negative voltage and temperature coefficients of resistance, and an increase in current through these elements reduces their resistance, an increase in their temperature also causing reduction in resistance. While my invention is not limited to any particular type of negative impedance-voltage characteristic impedance, I prefer at present to use a special ceramic resistance material comprising silicon carbide crystals held together by a suitable binder, such as described and claimed in United States Patent 1,822,742, issued to Karl B. McEachron on September 8, 1931.

In the form shown in the drawings, the nonlinear resistor 20 is pressed into the form of a flat annulus and fitted externally onto a spindle-like portion of the base 10 between a pair of flat disk-shaped conducting plates 25 and 26. The conducting plates 25 and 26 are held in intimate electric contact with the resistor 20 and the entire assembly is held firmly in place against the casing 10 by means of a spring washer 27 secured against the outer conducting plate 26 by a rivet 28 which passes axially through the base 10 and terminates within the hollow central post 11.

The circuit connection of the various relay elements of my protective relay is best shown schematically as at Fig. 4. From this figure it will be observed that the bimetallic element 13 and the nonlinear negative resistance-voltage characteristic resistor 20 are connected in series circuit relation with each other and form a shunt circuit for the main heating resistor 18. The manner in which these connections are made in the relay itself may be followed with the aid of Figs. 2, 3, and 4. A pair of terminal conductors 30 and 31 at opposite ends of the heating resistor 18 are also interconnected by a heater shunt circuit comprising a flexible lead 32 connected between the terminal 30 and the movable end of the bimetallic member 13, the bimetallic member 13 itself, a lead wire 33 joining the fixed end of the bimetallic member 13 to the head of the rivet 28, the rivet 28, the conducting spring washer 27, the conducting plate 26, the resistor 20, the conducting plate 25, and a lead wire (not shown) connecting the plate 25 to the terminal 31.

The overload protective relay described above may be mounted within the oil-filled casing of a transformer to be protected. When the relay is so mounted the housing 10 will be filled and surrounded with the transformer oil, but free passage of oil between the inside and outside of the relay housing will be restricted due to the fact that the only passage therebetween is the small aperture in the housing 10 through which the detent lever 14 passes.

The operation of my overload protective system may be best appreciated by referring to the schematic circuit diagram of Fig. 4 in connection with the time-current operating characteristic curves of Fig. 5. In Fig. 4 I have shown a high voltage line conductor 40 supplying through a sectionalizing fuse 41 a typical group of small business or residence house circuits or loads 43, 44, 45, and 46. It will be understood of course that the loads 43—46 inclusive are illustrative only both as to number and type and that such loads typically comprise domestic appliances, small motors, electric lamps, and the like. For convenience of representation these loads have been shown simply as load resistors. The loads 43 and 44 are connected through house entrance switches 47 and 48 respectively and house entrance fuses 49 and 50, respectively, to the low voltage side of a distribution transformer 51. Similarly, the loads 45 and 46 are connected through house entrance switches 52 and 53, respectively, and house entrance fuses 54 and 55, respectively, to the low voltage side of a distribution transformer 56. The high voltage windings of the distribution transformers 51 and 56 are connected in parallel circuit relation through a pair of transformer protective relays 57 and 58, respectively, and a pair of circuit breakers 59 and 60, respectively, to the load side of the sectionalizing fuse 41 and thus to the high voltage line conductor 40.

Assuming that the maximum current that can be supplied continuously by each transformer to its group of house circuits or loads is 20 amperes, the house fuses 49, 50, 54, and 55 are selected in accordance with widely accepted standards with maximum continuous current ratings of 60 amperes, while the sectionalizing fuse 41 may have a maximum continuous current rating corresponding to 200 amperes in the transformer secondary. The rating of the fuse 41 will depend upon the total number of transformers connected through it to the line. Fig. 5 shows time-current operating curves for such a supply system, the house fuse and sectionalizing fuse characteristics being represented by the curves A and B, respectively, and the transformer low voltage or secondary circuit characteristic by the curve C. It will be understood that in these curves the "time" for the fuses is the time required for the fuses to blow at the particular current value, while for the transformer the "time" is the maximum permissible time that the particular current can be supplied by the transformer, i. e., can be supplied without objectionable overheating and possible damage to the transformer.

In Fig. 5, the broken line curve E is the time-current characteristic of a protective device embodying my invention provided for each of the transformers 51 and 56. As shown by this curve E, the device operates in the low current range to the right of the point D to deenergize the transformer in response to currents slightly higher than the currents of curve C. The slightly higher current values of curve E are the permissible maximum current values at which the transformer protective device operates to protect the transformer. These current values of the curve E are, of course, low enough to avoid damage to the transformer, and they may be the same as the values of curve C in which case the curve E is coincident with the curve C up to the point D.

The curves of Fig. 5 show that each house fuse, as represented by the curve A, gives full protection for the transformer against heavy overload currents in any one house circuit of a value in the range above or to the left of the current value at the point D. This range in the example given is the near short circuit and short circuit range of about 95 amperes at point D and above.

The protection for the current range below the point D provided by the house fuse, i. e., over the low overload current range, is insufficient for the transformer. Moreover, since there are several of these house circuits each of which can thus overload and damage the transformer, it is evident that the house fuses give little if any protection to the transformer in this low overload current range.

It will be observed that, as shown by the broken line curve E of Fig. 5, a protective device for the transformer embodying my invention gives the time-current characteristics of the fuse in the high overload current range to the left of and above the point D, while in the low current range to the right of and below the point D the device has a time-current characteristic similar to the transformer itself, thereby to protect the transformer.

The time-current operating characteristic E of Fig. 5 is attained with my device by reason of the fact that in the low overload current operating range the voltage across the heating resistor 18 is relatively low so that the voltage applied to the nonlinear negative resistance-current characteristic resistor 20 is also low and the resistance of this resistor is relatively high. The high resistance of the resistor 20 has the effect of substantially disabling the shunt circuit around the resistor 18 through the resistor 20 and the bimetallic element 13 so that substantially no direct heat is developed by passage of current through the bimetallic element 13 itself. With the element 13 thus exposed only to indirect heat from resistor 18 it operates to open the circuit breaker 59 or 60 in accordance with a time-current characteristic substantially parallel to the curve C as shown in the low current range of Fig. 5.

When the load current through the high voltage side of a distribution transformer rises to a predetermined relatively high value, preferably a value greater than the minimum current necessary to cause blowing of one or more of the house fuses on the low voltage side of the transformer, the resistance of the resistor 20 rapidly and materially decreases and renders the shunt circuit through this resistor and the bimetallic strip 13 effective. Thus the heat generated directly in the bimetallic strip 13 by the passage of current through the strip itself becomes appreciable. The direct heat thus generated is sufficient to predominate in the control of the bimetal and has the effect of accelerating the response of the bimetal with respect to the total load current.

The bimetallic strip 13 is preferably so selected that in the high current operating range its time-current characteristic is substantially parallel to a fuse characteristic such as represented by the curves A and B and falls between these curves. The location of the curve E between the curves A and B in the high current range endows the relay with a fuse characteristic in the range above the point D. A fuse characteristic is desirable in this range because the relay is acting primarily as a fuse to protect the sectionalizing fuse and only secondarily to protect the transformer. The curve E above the point D should lie below the sectionalizing fuse curve B so that the relay will trip before the line fuse in the event that the line overload is due to an overload on only one transformer of a group. Of course, if no one transformer of a group is overloaded but the line circuit is overloaded, the line fuse will blow. Furthermore, the curve E should be above the curve A in the high current range so that if the high overload on the transformer is due to short circuit of a single customer's load, the house entrance fuse will isolate that load before the transformer is disabled. It will of course be understood that below the point D, where the transformer becomes overloaded, before the primary circuit or any customer's circuit, the relay should follow the transformer characteristic C, as shown with desirable slightly greater current values, since only the transformer is being protected in this range.

It will be understood that, even after the circuit through the bimetallic strip 13 is rendered effective by diminution of the resistance of the resistor 20, the current through the indirect heater 18 does not decrease, but in fact continues to rise as the load current increases. The reason for this is that the resistance of the resistor 20 decreases only because the current through it increases, and if the current does increase, it indicates that there is an increasing voltage drop across and current through the heater 18. However, due to relatively greater increase in the amount of direct heating from the bimetallic strip itself and due to the effect of the baffle plate 19, the direct heat generated in the bimetal is predominant in the high overload current range. However, while in the high current range the current carrying bimetallic strip 13 acts substantially independently of the heater 18 for the above reasons, the continuance of some heating effect from the resistor 20 is not detrimental to the operation since it supplements the direct heat and accelerates relay operation. It will be evident that to obtain the desired response with the form of the device shown, it is necessary to select a bimetallic element 13 which, when subjected primarily to direct or self-generated heat, shall have an operating characteristic substantially similar to that of a fuse, and when subjected primarily to indirect heat shall have a characteristic similar to the safe overload characteristic of a transformer.

At Fig. 6 I have shown a schematic diagram of a transformer overload relay embodying my invention in a modified form. From the foregoing description it will be evident that the relay of Fig. 6 may be mounted in a divided casing or housing similar to the casing 10 of Figs. 1, 2, and 3 for immersion in the oil-filled tank of a transformer, and may be connected in series circuit relation with the high voltage winding of a distribution transformer as in the diagram of Fig. 4. Referring now to Fig. 6, the modified form of relay there shown comprises a bimetallic actuating member 70, a current transformer 71 connected in series circuit relation between the switch contacts of the line breaker 60 and the high voltage winding of the distribution transformer 56, and an indirect resistance heater 72 energized from the secondary winding of the current transformer 71. The resistance of the bimetallic member 70 is such that no substantial amount of heat is generated therein by the passage therethrough of a relatively small overload current. The current transformer 71 is designed so that it reaches saturation at a current lying between the desired low and high overload current ranges. In operation, the heating effect of the indirect resistance heater 72 predominates in the control of the bimetallic member 70 so long as the overload current encountered lies in a predetermined low overload range below the saturation point of the current transformer 71. As the overload current increases to the point where the transformer 71 becomes saturated, the heat available from the indirect resistance heater 72 reaches a maximum, while the higher current is effective to generate directly within the bimetallic member 70 a substantial amount of heat sufficient to accelerate the operation of the relay in the high current range.

It will be understood that if desired the secondary winding of the current transformer 71 may be arranged as a short circuited secondary winding which serves as the indirect heater.

At Fig. 7 I have shown a further modification of my invention comprising a thermo-responsive relay which, like the relays of Figs. 1, 2, 3, and 6, may be mounted in a divided casing and immersed in the transformer oil. The manner in which the relay of Fig. 7 may be connected in the distribution circuit of Fig. 4 is indicated as at Fig. 6 by the inclusion in the figure of adjacent apparatus identified by reference numerals corresponding to the reference numerals on the diagram of Fig. 4. The relay of Fig. 7 comprises a bimetallic actuating member 80, an indirect resistance heater 81, and an overcurrent relay 82 having an actuating coil 83, all connected in series circuit relation between the contacts of the line breaker 60 and the high voltage winding of the distribution transformer 56. The overload relay 82 is provided with a contact 84 arranged to connect a shunting resistor 85 across the terminals of the indirect heater 81. As in the modification of Fig. 6, the resistance of the bimetallic actuating member 80 is such that the passage of a relatively small overload current therethrough will generate only a negligible amount of heat. The relay 82 is arranged to close its contacts upon the occurrence of an overload current lying between the desired low and high overload current ranges. In operation, currents having a value less than the actuating current of the relay 82 pass in series circuit relation through the direct heater constituted by the bimetallic element 80 and the indirect heater 81, and the heat generated in the heater 81 is predominant in its effect upon the bimetallic member. Upon the occurrence of a high overload the relay 82 closes its contacts to shunt the indifferent heater 81 by means of the resistor 85. Thus, the heat generated by the indirect heater 81 is limited, while the increased current generated directly within the bimetallic member 80 a sufficient amount of heat to predominate in controlling the movement of the bimetallic member and to accelerate its response.

It will now be evident that I have provided a distribution system having separate line, load, and transformer protective means so coordinated that where an overload arises on a particular load circuit, only that circuit is disabled, where an overload on a single transformer arises from the sum of its load circuits, only that transformer is disabled, and only where an overload arises from the sum of a connected group of transformers is the entire group disabled. Such system cooperation limits each protective device to its own peculiar function and always results in a maximum localization of service interruptions.

While I have shown only certain preferred embodiments of my invention by way of illustration, many further modifications will occur to those skilled in the art and I therefore wish to have it understood that I intend by the appended claims to cover all such modifications as fall within the true spirit and scope of my invention.

What I claim as new and desire to secure by Letters Patent of the United States, is:

1. An electric distribution system characterized by improved continuity of service under abnormal load conditions comprising a transformer, switching means for connecting said transformer to a source of electric current supply, a thermo-responsive member operable to cause the opening of said switching means, electric heating means for said thermo-responsive member connected in circuit with said transformer and proportioned to actuate said thermo-responsive member in accordance with a predetermined time-current characteristic permissible for said transformer under low overload conditions, and means responsive to the current traversing a winding of said transformer for accelerating the actuation of said thermo-responsive member under more severe overload conditions as a function of the severity of said overload conditions.

2. An electric distribution system comprising a transformer, a fusible overload responsive element connected in circuit with said transformer, switching means for connecting said transformer to a source of electric current supply, a thermo-responsive bi-metallic member operable to cause the opening of said switching means, electric heating means for said bimetallic member, said bimetallic member and said electric heating means being connected in circuit with said transformer to carry currents proportional to the current carried by said transformer, the current carriet by said bimetallic member under relatively light overload conditions being substantially ineffecitve to heat said element directly and said electric heating means being proportioned to actuate said bi-metallic member in accordance with a predetermined maximum time-current characteristic permissible for said transformer under such overload conditions, and means responsive to the current carried by said transformer for causing a substantially greater proportion of said current to pass through said bi-metallic element thereby directly to heat said element to an extent predominating over the indirect heating from said electric heating means and to actuate said bimetallic member in accordance with a second predetermined maximum time-current characteristic permissible for said fusible means under severe overload conditions.

3. An electric distribution system comprising a transformer, an overload responsive fusible element connected in circuit with said transformer, switching means for connecting said transformer to a source of electric current supply, a thermo-responsive bi-metallic element and an electric heating resistor connected in series circuit relation with said transformer to actuate said switching means to a circuit opening position, the current passing through said bi-metallic member under light overload conditions being ineffective appreciably to heat said member and said electric heating means being proportioned to predominate in the control of said bi-metallic member under such overload conditions and to actuate said member in accordance with a predetermined time-current characteristic permissible for said transformer under said light overload conditions, and means responsive to the current passing through said transformer for at least partially disabling said electric heating means under severe overload conditions thereby to permit the heat generated directly in said bimetallic member to predominate in the control of said member and to accelerate the actuation of said member in accordance with a second predetermined maximum time-current characteristic permissible for said fusible means under severe overload conditions.

4. An electric distribution system comprising a load circuit including a plurality of electric circuit elements connected in series circuit relation and having different permissible time-current overload characteristics whereby under one range of overload conditions the permissible duration of current flow is limited by one of said circuit elements and under another range of overload conditions the permissible duration of current flow is limited by another of said circuit elements, switching means for connecting said elements to a source of electric current supply, and relay means responsive to an overload upon said circuit for controlling said switching means, the time-current response characteristic of said relay means in each of said ranges of overload conditions corresponding to the shorter one of the permissible durations of current flow as determined by said circuit elements.

5. An electric distribution system comprising a load of circuit including a plurality of circuit elements connected in series circuit relation and having different permissible time-current characteristics whereby under one range of overload conditions the permissible duration of current flow is limited by one of said elements and under another range of overload conditions the permissible duration of current flow is limited by another of said elements, switching means for connecting said elements to a source of electric current supply, a thermo-responsive member operable to cause opening of said switching means, electric heating means for said thermo-responsive member connected in said load circuit and proportioned to actuate said thermo-responsive member in accordance with a predetermined time-current characteristic permissible for one of said elements under light overload conditions, and means responsive to the current in said load circuit for accelerating the actuation of said thermo-responsive member under severe overload conditions as a function of a second predetermined time-current characteristic permissible for another of said circuit elements under said severe overload conditions.

6. An electric distribution system comprising a load circuit including a transformer and a plurality of electric circuit elements connected in series circuit relation, said transformer and at least one other of said circuit elements having different permissible time-current characteristics whereby under one range of overload conditions the permissible duration of current flow is limited by said transformer and under another range of overload conditions the permissible duration of current flow is limited by said other circuit element, switching means for connecting said transformer to a source of electric current supply, a thermo-responsive member and an electric heating element therefor connected in circuit with said transformer to carry a current proportional to the current carried by said transformer, the current carried by said thermo-responsive member in one of said ranges of overload conditions being ineffective appreciably to heat said member directly whereby said electric heating means predominates in the control of said thermo-responsive member to actuate said member in accordance with a predetermined maximum time-current characteristic permissible for said transformer, and means responsive to the current carried by said transformer for passing a substantially greater proportion of current through said thermo-responsive member thereby to accelerate the actuation of said thermo-responsive member in said other range of overload conditions in response to predominant direct heating of said member and according to a second predetermined maximum time-current characteristic permissible for said other circuit element.

7. An electric distribution system comprising a transformer, switching means for connecting said transformer to a source of electric current supply, a thermo-responsive member operable to disable said switching means, electric heating means in heat conductive relation with said thermo-responsive member, said electric heating means being connected in circuit with said transformer for supplying to said heating means a current proportional to the current carried by said transformer thereby to establish a voltage drop across said heating means and to actuate said thermo-responsive member in accordance with a predetermined time-current characteristic, electro-responsive means for accelerating the response of said thermo-responsive member with respect to that indicated by said time-current characteristic, and means responsive to said voltage drop for controlling the effectiveness of said electro-responsive means comprising an impedance element having a negative impedance-voltage characteristic.

8. An electric distribution system comprising a transformer, switching means for connecting said transformer to a source of electric current supply, a thermo-sensitive bi-metallic element arranged to disable said switching means, an electric heating resistor in indirect heat conductive relation with said bi-metallic element, said heating resistor being connected in series circuit relation with a winding of said transformer for supplying heating current to said bimetallic element to actuate said element in accordance with a predetermined time-current characteristic when the current supplied to said transformer exceeds a predetermined minimum value, means for passing electric current through said bimetallic element directly to heat said element thereby to accelerate its response with respect to that indicated by said characteristic, and a non-linear negative resistance-voltage characteristic resistor connected in shunt circuit relation with said heating resistor to control the current flowing through said bimetallic element.

9. An electric distribution system comprising a receptacle containing an insulating fluid, an electric transformer immersed within the body of said fluid in said receptacle, switching means for connecting said transformer to a source of electric current supply, a casing of insulating material mounted within said receptacle for immersion in said fluid, said casing having a restricted aperture therein to permit the filling of said casing with said fluid but to restrict ready passage of oil between the interior and exterior of said casing, a baffle plate positioned within said casing to divide said casing into two compartments connected by a restricted passage, a thermo-sensitive bimetallic element positioned within one of said compartments and arranged to disable said switching means, electric heating means disposed within each of said compartments in heat conductive relation with said bimetallic element, means for supplying electric current to both said electric heating means, the current supplied to at least one of said electric heating means being proportional to the current carried by said transformer, and means responsive to the energization of said one electric heating means substantially to disable the other of said electric heating means whenever the current in said one electric heating means is less than a predetermined value.

10. An electric circuit overload protective apparatus comprising a load circuit, a thermo-responsive circuit controlling member, direct and indirect electric heating means in heat conductive relation with said member, said heating means being connected in said load circuit to carry a current proportional to the current in said load circuit and being proportioned so that under light overload conditions said indirect heating means predominates in the control of said thermo-responsive member, and means responsive to the occurrence of a severe overload on said circuit for increasing the relative proportion of current carried by said direct heating means thereby to render said direct heating means predominant and response of said thermo-responsive member substantially as a function of the heat supplied by said direct heating means.

11. An electric circuit overload protective apparatus comprising a load circuit, a thermo-responsive circuit controlling member, electric heating means for said thermo-responsive member, said thermo-responsive member and said electric heating means being permanently connected in said load circuit to carry heating currents proportional to the current in said load circuit and being proportioned so that under light overload conditions the heat supplied by said electric heating means predominates in the control of said thermo-responsive member to actuate said member in accordance with a predetermined maximum permissible time-current characteristic, and means responsive to the current in said load circuit for at least partially disabling said electric heating means under severe overload conditions thereby to render said thermo-responsive member predominantly responsive to heat generated directly in said member by the current passing therethrough and to accelerate the response of said member under said severe overload conditions.

12. An electric circuit overload apparatus comprising a thermo-responsive circuit-controlling member, electric heating means in heat conductive relation with said member, means for supplying current to said heating means to establish a voltage drop thereacross and to actuate said thermo-responsive member in accordance with a predetermined time-current characteristic, electro-responsive means for modifying said time-current characteristic, and means responsive to said voltage drop for controlling the effectiveness of said electro-responsive means comprising an impedance element having a negative impedance-voltage characteristic.

13. An electric circuit overload protective system comprising a thermo-responsive circuit-controlling member, electric heating means in heat conductive relation with said member, means for supplying electric current to said heating means to establish a voltage drop thereacross and to actuate said thermo-responsive member in accordance with a predetermined time-current characteristic, electro-responsive means for accelerating the response of said member with respect to that indicated by said time-current characteristic, and means responsive to said voltage drop for controlling the effectiveness of said electro-responsive means comprising an impedance element having a negative impedance-voltage characteristic.

14. An electric circuit overload protective apparatus comprising a thermo-responsive circuit-controlling member, electric heating means in heat conductive relation with said member, means for supplying electric current to said heating means to establish a voltage drop thereacross and to actuate said thermo-responsive member according to a predetermined time-current characteristic, a second electric heating means for modifying said time-current characteristic to accelerate the response of said thermo-responsive element, and impedance means responsive to said voltage drop for substantially disabling said second electric heating means when the current supplied to said first heating means is less than a predetermined value, said impedance means comprising an element having a negative impedance-voltage characteristic.

15. An electric circuit overload protective apparatus comprising a thermo-responsive circuit-controlling member, electric heating means in indirect heat conductive relation with said member, means for supplying electric current to said heating means to establish a voltage drop thereacross and to actuate said thermo-responsive member in accordance with a predetermined time-current characteristic, a second electric heating means in direct heat conductive relation with said thermo-responsive member for modifying said time-current characteristic, and impedance means responsive to said voltage drop for controlling said second electric heating means comprising an element having a negative impedance-voltage characteristic.

16. An electric circuit overload protective apparatus comprising a thermo-responsive circuit-controlling member, first electric heating means in heat conductive relation with said member, means for supplying electric current to said heating means to actuate said thermo-responsive member in accordance with a predetermined time-current characteristic when said current is greater than a predetermined minimum value determined by said characteristic, second electric heating means in heat conductive relation with said thermo-responsive member for modifying said time-current characteristic, and means responsive to the voltage drop across said first electric heating means for normally substantially disabling said second heating means and for rendering said second heating means effective when said current attains a predetermined value greater than said minimum value.

17. An electric circuit overload protective apparatus comprising a thermo-responsive circuit controlling member, a first electric heating element positioned in indirect heat conductive relation with said member and connected to carry a current proportional to the current in said electric circuit, said heating element supplying heat to said member thereby to actuate said member in accordance with a predetermined time-current characteristic, a second electric heating element positioned in direct heat conductive relation to said thermo-responsive member for modifying said time-current characteristic, and a non-linear negative impedance-voltage characteristic impedance connected in shunt circuit relation with said first electric heating element to control the energization of said second electric heating element.

18. An electric circuit overload protective apparatus comprising a thermo-sensitive bi-metallic element arranged to disable said circuit, an electric heating resistor in indirect heat conductive relation with said bi-metallic element, said heating resistor being connected in series circuit relation to said electric circuit and arranged to supply heat to said bi-metallic element to actuate said element in accordance with a predetermined time-current characteristic when the current in said electric circuit exceeds a predetermined minimum value, means for passing electric current through said bi-metallic element directly to heat said element thereby to accelerate its response with respect to that indicated by said characteristic, and a non-linear negative resistance-voltage characteristic resistor connected in shunt circuit relation with said heating resistor to control the current flowing through said bi-metallic element.

19. An electric circuit overload protective apparatus comprising a liquid-filled casing of insulating material, a thermo-sensitive bi-metallic element positioned within said casing and arranged to disable said circuit, an electric heating resistor positioned within said casing and connected in series circuit relation with said electric circuit thereby to supply heat to said bi-metallic element and to actuate said element in accordance with a predetermined time-current characteristic whenever the current in said load circuit exceeds a predetermined minimum value, and a shunt circuit for said electric heating resistor comprising said bi-metallic element and a non-linear negative resistance-voltage characteristic resistor connected in series circuit relation with said bi-metallic element, said non-linear resistor substantially disabling said shunt circuit through said bi-metallic element while the current in said electric circuit is less than a predetermined value greater than said minimum value and rendering said shunt circuit effective to accelerate the response of said bi-metallic element when the current in said circuit exceeds said predetermined value.

20. An electric circuit overload protective apparatus comprising a liquid-filled casing of insulating material, a baffle plate positioned within said casing to divide said casing into two compartments connected by a restricted passage, a thermo-sensitive bi-metallic element positioned within one of said compartments and arranged to disable said electric circuit, an electric heating resistor disposed within the other of said compartments and connected in series circuit relation with said electric circuit, said electric heating resistor being in restricted heat conductive relation with said bi-metallic element thereby to cause actuation of said bi-metallic element with a predetermined time-current characteristic whenever the current in said electric circuit exceeds a predetermined minimum value, and a shunt circuit for said heating resistor comprising said bi-metallic element and a non-linear negative resistance-voltage characteristic resistor connected in series circuit relation with said bi-metallic element, said non-linear resistor having a resistance sufficient substantially to disable the shunt circuit through said bi-metallic element while the current in said electric circuit is less than a predetermined value but in excess of said minimum value and having the property of substantially decreasing its resistance and thereby rendering said shunt circuit effective to modify said time-current characteristic and accelerate the response of this bi-metallic element upon the occurrence of a current in said electric circuit in excess of said predetermined value.

21. An electric circuit overload protective apparatus comprising a liquid-filled casing of insulating material, a baffle plate positioned within said casing to divide said casing into two compartments connected by a restricted passage, a thermo-sensitive bi-metallic element positioned within one of said compartments and arranged to disable said electric circuit, electric heating means disposed within each of said compartments in heat conductive relation with said bi-metallic element, means for supplying electric current to both said electric heating means, the current supplied to at least one of said electric heating means being proportional to the current in said electric circuit, and means responsive to the energization of said one electric heating means substantially to disable the other of said electric heating means whenever the current in said one electric heating means is less than a predetermined value.

22. An electric circuit overload protective apparatus comprising a liquid-filled casing of insulating material, a baffle plate positioned within said casing to divide said casing into two compartments connected by a restricted passage, a thermo-sensitive bimetallic element positioned within one of said compartments and arranged to disable said electric circuit, an electric heating element disposed within each of said compartments in heat conductive relation with said bimetallic element, means for supplying to both said electric heating elements a current proportional to the current in said electric circuit, and a non-linear negative resistance voltage characteristic resistor connected in series circuit relation with one of said heating elements alternatively to substantially disable one of said heating elements and render the other of said elements effective in dependence upon the magnitude of current in said electric circuit.

23. An electric distribution system comprising a primary circuit, a plurality of groups of transformers connected in parallel circuit relation to said primary circuit, each of said groups of transformers being connected to said primary circuit through a sectionalizing fuse, a plurality of load circuits connected in parallel circuit relation to each of said transformers, each of said load circuits being connected to its associated transformer through a load fuse, separate circuit-controlling means for disconnecting each of said transformers from said primary circuit, and means responsive to the current carried by said transformer for actuating said circuit controlling means, said current-responsive means including means operable within a predetermined low transformer overload current range of the associated transformer to actuate said circuit controlling means with a time-current characteristic similar to the permissible time-current characteristics of the transformer and means operable within a predetermined high transformer overload current range of the associated transformer to actuate said circuit controlling means with a time-current characteristic qualitatively similar to those of said fuses and quantitatively such as to protect said sectionalizing fuse while permitting prior operation of any single overloaded house fuse.

JAMES R. BARR.